US007024232B2

(12) United States Patent
Ponce De Leon et al.

(10) Patent No.: US 7,024,232 B2
(45) Date of Patent: Apr. 4, 2006

(54) WIRELESS COMMUNICATION DEVICE WITH VARIABLE ANTENNA RADIATION PATTERN AND CORRESPONDING METHOD

(75) Inventors: Lorenzo A. Ponce De Leon, Lake Worth, FL (US); Christos Kontogeorgakis, DelRay, FL (US); Robert Andrew Kroegel, Boynton Beach, FL (US); Glafkos Stratis, Lake Worth, FL (US); Gary L. Eisenhauer, Boynton Beach, FL (US); Glenn Scott Zax, Boynton Beach, FL (US); Frederick A. Baracat, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 161 days.

(21) Appl. No.: 10/423,095

(22) Filed: Apr. 25, 2003

(65) Prior Publication Data

US 2004/0214621 A1    Oct. 28, 2004

(51) Int. Cl.
*H04B 1/38* (2006.01)

(52) U.S. Cl. .................... 455/575.5; 106/300; 343/702
(58) Field of Classification Search ............. 455/575.5, 455/106, 300; 343/702
See application file for complete search history.

(56) References Cited

U.S. PATENT DOCUMENTS

| 2002/0119808 A1* | 8/2002 | Seiki .......................... 455/575 |
| 2004/0046694 A1* | 3/2004 | Chiang et al. .............. 342/360 |

* cited by examiner

*Primary Examiner*—Lee Nguyen
(74) *Attorney, Agent, or Firm*—Charles W. Bethards

(57) ABSTRACT

A communication device 10 and a corresponding method are arranged for changing the radiation pattern of an antenna 14, where the radiation pattern of the antenna 14 is set to a half-space pattern if the communication device 10 is in close proximity to an object. A reflector 18 is activated to produce the half space radiation pattern. The reflector 18 is deactivated to produce the full space pattern. A switching device 26 determines the state of the reflector 18. A sensing and control device 23 controls the state of the switching device 26.

20 Claims, 6 Drawing Sheets

WIRELESS COMMUNICATION DEVICE WITH VARIABLE ANTENNA RADIATION PATTERN AND CORRESPONDING METHOD

FIELD OF THE INVENTION

This invention relates in general to wireless communication devices, and more specifically to wireless communication devices having variable antenna patterns and methods for changing such patterns.

BACKGROUND OF THE INVENTION

Wireless communication devices generally refer to communications terminals that provide a wireless communications link to one or more other communications terminals. Wireless communication devices may be used in a variety of different applications, including cellular telephone, land-mobile (e.g., police and fire departments), and satellite communications systems. Wireless communication devices typically include an antenna for transmitting and/or receiving wireless communications signals.

With standard wireless communication devices, radiated performance of an antenna can be affected by the manner in which the devices are utilized and radiated performance may impact the quality of service provided by the device. Typically users position the communications device, such as a cellular phone or handset in proximity to their head and this may affect the antenna performance. Regulatory agencies dictate limits on radiated performance, such as power levels and the like. Permanent metallic shields or reflector elements may be placed in the housing of the communications in order to affect to the radiation pattern or performance. A side of the device that is opposite to the user remains unshielded to provide a radiating surface for emitted energy. However, the shield can affect the performance of the wireless communication device, and the shield is not necessary when the communication device is not transmitting. For example, a shield may change operating impedances causing the output amplifier to consume higher levels of power, which reduces battery life. Also, some wireless communication devices are equipped with a speaker for hands-free operation. In the hands-free mode of operation, the location and orientation of the phone vary considerably and a shield can degrade performance of the communication device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

Figure 1:
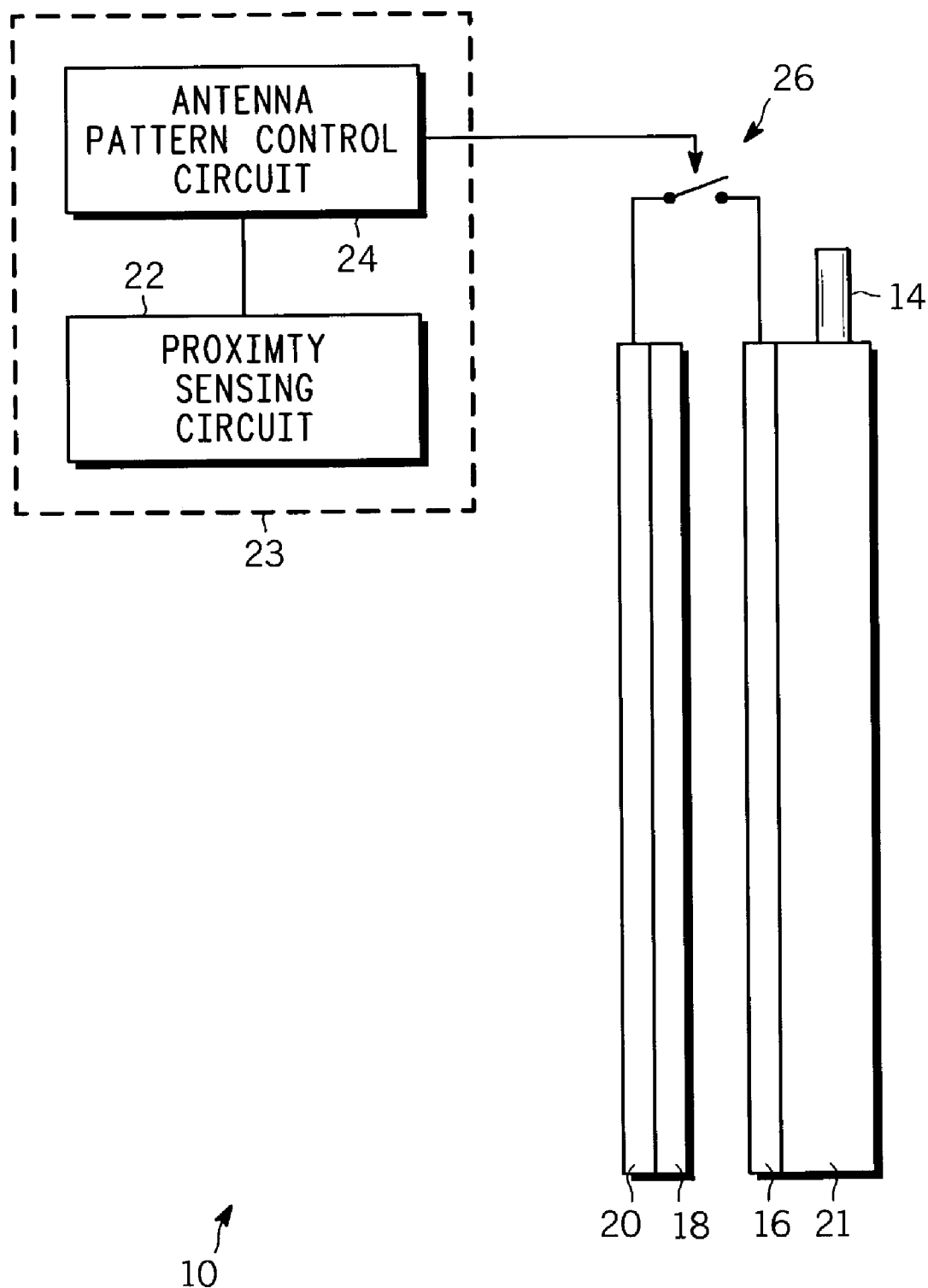
FIG. 1 is a diagram illustrating a wireless communication device according to a first embodiment of the invention.

In overview, the present disclosure concerns communications systems that provide services such as voice and data communications services to communications devices or units, often referred to as subscriber devices, such as cellular phones and two-way radios, personal digital assistants, or personal computers, preferably equipped for wireless operation, and the like.

More particularly various inventive concepts and principles embodied in communication devices and methods therein for providing a variable antenna or antenna pattern are discussed. The communication device can be a variety of devices, such as a, a cellular handset or device, or equivalents thereof.

The communications systems and communication devices that are of particular interest are those that provide or facilitate voice communication services or data or messaging services, such as conventional two way systems and devices, various cellular phone systems including analog and digital cellular, CDMA (code division multiple access) and variants thereof, GSM (Global System for Mobile Communication), GPRS (General Packet Radio System), 2.5 G and 3 G systems such as UMTS (Universal Mobile Telecommunication Service) systems, integrated digital enhanced networks and variants or evolutions thereof. Similarly, the communication systems and devices can include LAN (local area network) systems that employ anyone of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures.

As further discussed below various inventive principles and combinations thereof are advantageously employed to provide a wireless communication device, an antenna apparatus, a method for providing a wireless communication with an antenna, and a method of changing the radiation pattern of an antenna, thus alleviating various problems associated with known antennas and wireless devices provided these principles or equivalents thereof are employed.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, upper and lower and the like are used solely to distinguish one from another entity or action without necessarily requiring or implying any actual such relationship or order between such entities or actions.

The terms "a" or "an" as used herein are defined as one or more than one. The term "plurality" as used herein is defined as two or more than two. The term "another" as used herein is defined as at least a second or more. The terms "including," "having" and "has" as used herein are defined as comprising (i.e., open language). The term "coupled" as used herein is defined as connected, although not necessarily directly and not necessarily mechanically. The terms "program" and "routine" as used herein defines a sequence of instructions designed for execution on a computer system. A program or routine may include a subroutine, a function, a procedure, an object method, an object implementation, an executable application, an applet, a servlet, a source code, an object code, a shared library/dynamic load library and/or other sequence of instructions designed for execution on a processor.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Basically, the present disclosure concerns a wireless communication device 10 including: a transmitter, an antenna 14 coupled to the transmitter for transmitting radio waves, and a reflector element 18, which cooperates with the antenna 14 to permit the communication device 10 to transmit radio waves in full space when inactive and to cause the communication device 10 to transmit in half-space when active. Further, the device includes a switching device 26 for activating and deactivating the reflector element 18.

Figure 2:
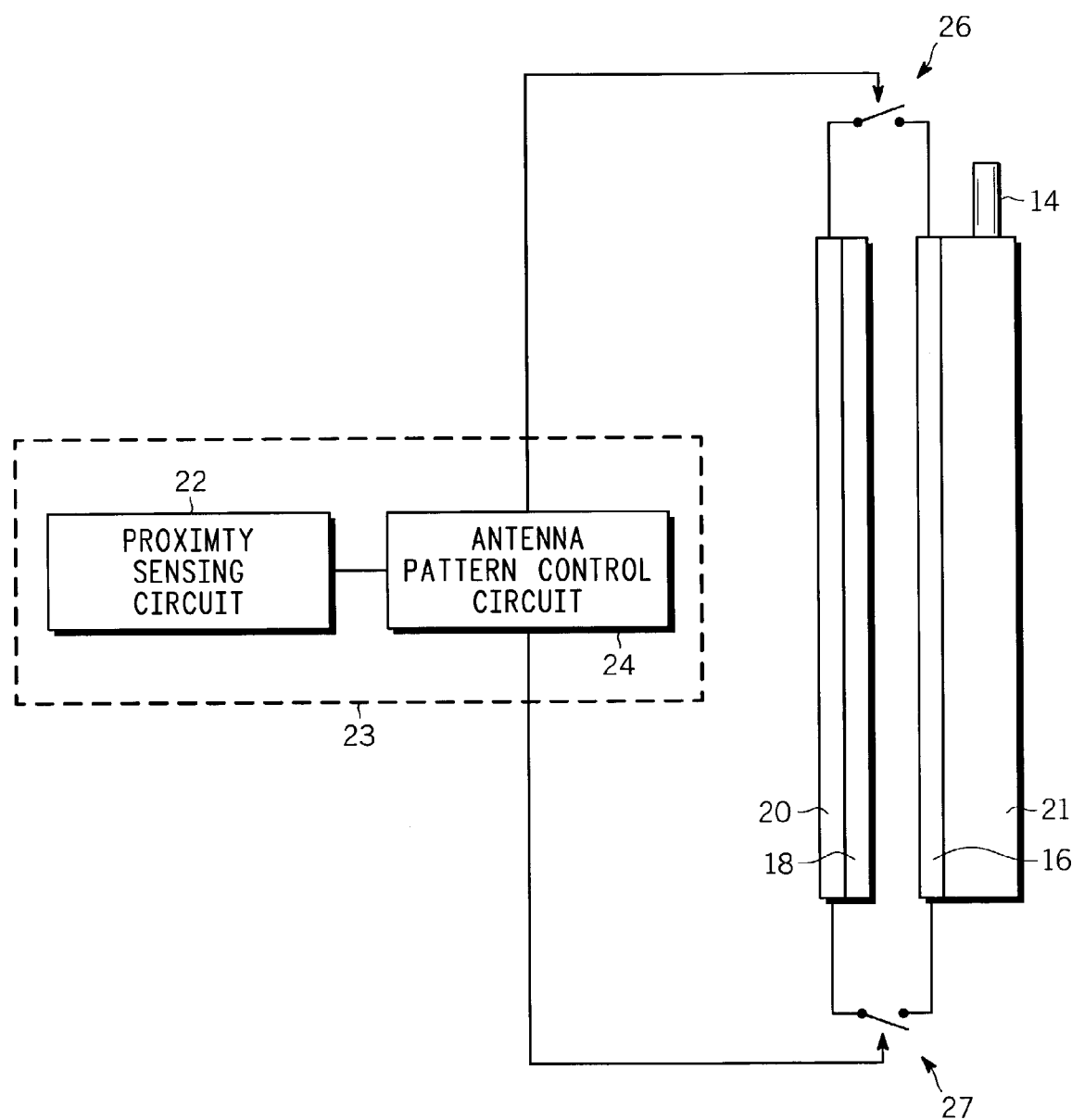
FIG. 2 is a diagram illustrating a wireless communication device according to a second embodiment.

The communication device is shown diagrammatically in FIGS. 1–4. The communication device 10 illustrated in FIGS. 1 and 2 is a cellular telephone; however, the communication device 10 may be any type of radio transmitter or transceiver including a cordless phone or a personal communicator. The invention is especially useful in communication devices that are portable and can be held close to an object, such as the user's head. The communication device 10 is self-contained, and a sensing and control device 23 is located inside a housing 20, 21 of the communication device. The sensing and control device 23 is located outside of the communication device housing 20, 21 in the drawings only for ease of illustration. The drawings are not to scale and are diagrammatic in nature.

The communication device 10 includes a front housing member 20 and a rear housing member 21, which enclose and support various components including a circuit board (not illustrated) and a ground plane 16, or chassis. FIGS. 1 and 2 show the front housing member 20, a reflector element 18, the ground plane 16 and the rear housing member 21 as a lamination for illustrative purposes; however, the front and rear housing members 20, 21 enclose and house the ground plane 16, the reflector element 18, a battery, the circuit board and other parts. Normally, the ground plane 16 is formed on a printed circuit board, is metal, and serves to ground a plurality of components. Other unillustrated parts of the communication device include a keypad, a speaker, a microphone and a display. The front surface of the communication device 10 is defined herein as the surface that faces the user when the user is making a call with the device 10 held in the normal position or proximate to the head, regardless of the location of a keypad or a display.

Figure 3:
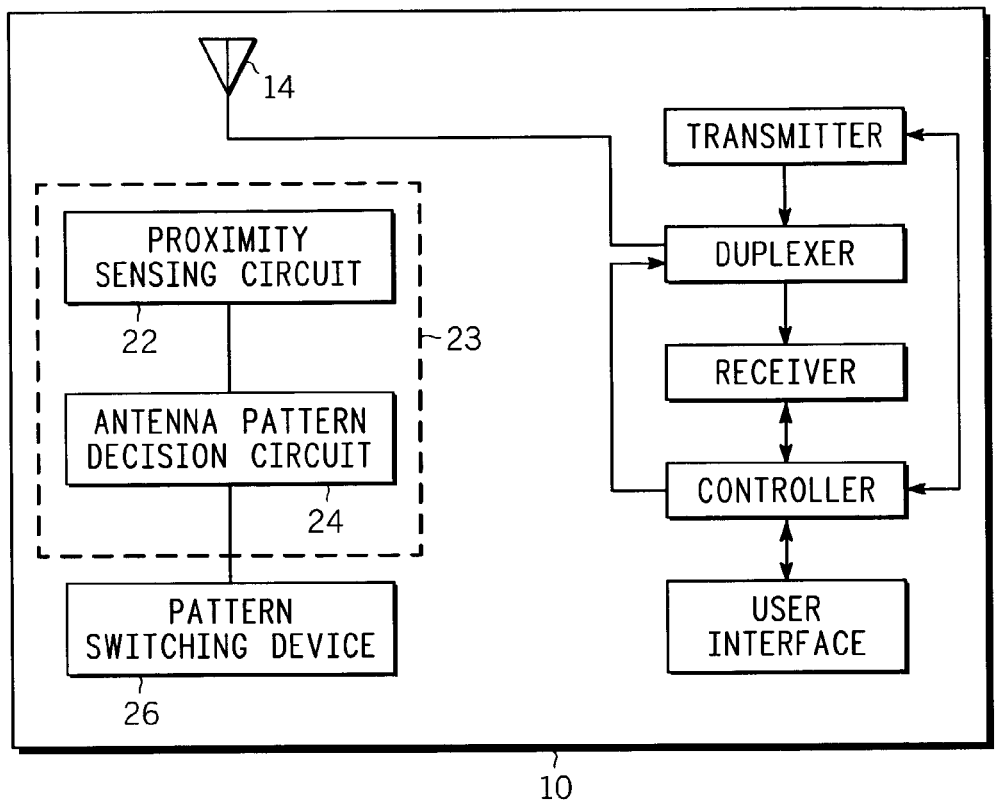
FIG. 3 is a block diagram illustrating a communication device illustrating further details of the communication devices of FIGS. 1 and 2.

FIGS. 1–3 show the antenna 14. FIG. 3 shows an antenna 14 connected to a transmitter in a conventional manner. A power amplifier is included in the transmitter of FIG. 3 and is not separately illustrated. In the illustrated embodiment, the antenna 14 is coupled to a transmitter through a duplexer. Alternatively, although not illustrated, the antenna 14 may be connected to a transmitter and a receiver through an antenna switch in another conventional manner. When the communication device is transmitting, the antenna 14 radiates energy from the power amplifier.

The reflector element 18 is shown in FIGS. 1 and 2. The reflector element 18, when activated, serves to change the radiation pattern of the antenna 14 by reflecting radiated energy away from the reflector element and thus away from any objects where the reflector element is between the antenna and the object, including for example a user of the communication device 10. More particularly, the reflector element 18 will serve to reflect radiated energy away from the head of the user when the communication device is held in typical close proximity to the head. The reflector element 18 can be activated and deactivated as discussed in detail below. Thus, the reflector element 18 changes the radiation pattern of the antenna 14. When active, the reflector causes the communication device to transmit in a half-space mode. When inactive, the reflector element 18 permits the communication device 10 to transmit in a full-space mode.

The reflector element 18 is a conductive layer or coating and is preferably metal. The reflector element 18 covers at least a portion of the front area of the communication device 10. In the preferred and illustrated embodiments, the reflector element 18 is the same or substantially the same in area as the front housing member 20. In the illustrated embodiments, only one reflector element 18 is illustrated; however, the front area of the communication device 10 may be covered with a plurality of reflector elements that are electromagnetically coupled to each other. Further, the reflector element 18 may extend to cover the sides of the communication device 10 leaving the rear surface of the communication device 10 uncovered.

The reflector element 18 can be a separate component installed within the front housing member 20 or can be integrated with the front housing member 20. That is, the reflector element 18 can be created by molding the front housing member 20 out of conductive plastic, by sputtering, painting, or vacuum depositing a conductive layer onto the inside surface or outside surface of the front housing member 20. Additionally, for example, metal inserts, molded wires, molded wire screen, conductive oxide or carbon layers or any combination thereof can be molded into the front housing member 20 to form the reflector element 18. The reflector element 18 can include a conductive lens or film to cover the display area if the display is located on the front side of the communication device. Also, the reflector element 18 can include conductive buttons if the keypad is located on the front side of the phone. Further details regarding reflector elements that may be used with the communication device 10 of the present invention can be found in U.S. patent application Ser. No. 10/195,262 filed on Jul. 15, 2002, which is incorporated herein by reference.

FIGS. 1–4 show the switching device 26. The switching device 26 couples and decouples the reflector element 18 and the ground plane 16. The switching device 26 is preferably an electrically controlled switch for creating ohmic contact between the reflector element 18 and the ground plane 16. In the embodiment of FIG. 2, one switching device 26 is employed. The switch 26 may be a transistor or a diode such as a PIN diode. The switching device 26 should have low ohmic loss, low inductance and must be able to handle the peak RF currents associated with the power amplifiers that deliver up to several watts. Electronic switches using PIN diodes can be constructed with low ohmic loss and low inductance. GaAs switches can be used at the cost of increased Ohmic losses. Electro-mechanical switches can also be used.

The structure for contacting or coupling the reflector element 18 to the switching device 26 and the ground plane 16 can be accomplished with common components such as spring contacts or conductive posts. The location of the contacts is important. The contacts must be located such that they can route the radio currents without introducing undue losses or unwanted resonances. The location will vary according to the specifics of the wireless communication device but can be determined by one of ordinary skill.

In the embodiment of FIG. 2, two switching devices 26, 27 are employed to couple the reflector element 18 to the ground plane 16. Otherwise, the embodiment of FIG. 2 is the same as that of FIG. 1. Contacts connecting the lengthwise ends of the reflector element 18 to the corresponding ends of the ground plane 16 can make the reflector element 18 appear to be part of the ground plane 16, which minimizes the potential for unwanted resonances and provides the best performance. The two switching devices 26, 27 are operated simultaneously in the embodiment of FIG. 2. Thus, when actuation of the switching device is referred to herein, it should be understood that this refers to simultaneous actuation of the switching devices 26, 27 in the embodiment of FIG. 2.

An antenna pattern control circuit 24 is employed to control the state of the switching device 26. The antenna pattern control circuit 24 is included in a sensing and control device 23, which may include a processor that executes a program for determining and controlling the state of the switching device 26. If the switching device 26 is, for example, a diode, the antenna pattern control circuit 24 is designed to provide the proper bias for the diode in a manner well understood by those skilled in the art. The antenna pattern control circuit 24 must actuate the switching device 26 to decouple the reflector element 18 from the ground plane 16 when the communication device 10 is in close proximity to a user, as discussed in more detail below. That is, the switching device 26 will be opened by the antenna pattern control circuit 24 when the communication device 10 is in close proximity to a user.

FIGS. 1–4 show a proximity sensing circuit 22. The proximity sensing circuit 22 is a circuit that determines when the communication device 10 is in close proximity to an object such as the user or the head of the user. The proximity sensing circuit 22 will cause the switching device 26 to activate the reflector element 18 when the communication device 10 is in close proximity to the object. The reflector element 18 is considered to be "active" when it is decoupled from the ground plane 16. The phrase "close proximity" refers to the normal distance between a communication device 10 such as a cellular telephone and a typical user; that is, anywhere from actual contact to several millimeters. However, detection of greater distances would be effective to accomplish the goal of changing the radiation pattern of the antenna or direction of radiated energy from the antenna. This can be accomplished in many ways. For example, the proximity sensing circuit 22 may include a photo-detector, an ultrasonic transducer, a capacitance sensor, or a thermal sensor to determine that an object or that a human head is in close proximity to the communication device 10. Thus, software executed by the sensing and control device 23 periodically reads the sensor of the proximity sensing circuit 22 during a transmission mode of the communication device 10 to determine close proximity and to control the state of the switching device 26 accordingly. That is, a condition of the transmitter is sensed, and the radiation pattern is controlled accordingly. For example, a routine for reading the state of the sensor may be performed several times per second. A processor may be included in either the antenna pattern control circuit 24 or the proximity sensing circuit 22 for executing such a routine.

In one preferred method of controlling the radiation pattern of the antenna 14, the proximity sensing circuit 22 is a reflected energy detection circuit for sensing the reflected energy of the antenna 14, and the sensed reflected energy is used to determine the state of the switching device 26. The reflected energy of the antenna 14 can be measured by measuring the impedance mismatch of the antenna 14, which is a known measurement of antenna performance. Return loss, reflection coefficient and VSWR (voltage standing wave ratio), for example, are antenna characteristics that are measures of reflected energy, or mismatch. The reflected energy of the antenna 14 changes when the communication device 10 is moved from a location spaced from any object to a location in close proximity to an object at least when the object affects the radiation pattern. Thus, the reflected energy can be used to determine proximity in controlling the switching device 26.

Figure 4:
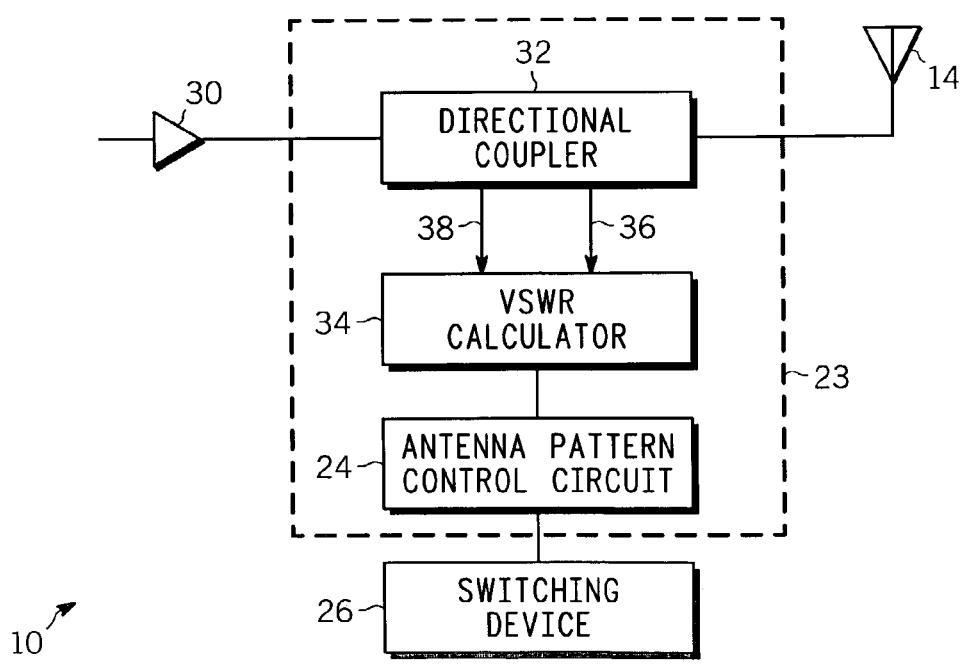
FIG. 4 is a schematic diagram illustrating parts of a communication device in which a VSWR sensor is included in a proximity sensor.

FIG. 4 illustrates one preferred embodiment of the communication device 10 in which VSWR is measured to determine proximity of the communication device 10 to an object, such as the human head of a user. A power amplifier 30 is connected to the antenna 14. The power amplifier 30 is part of a transmitter. A directional coupler 32 is used to determine the reflected energy of the antenna 14 by determining information necessary to calculate the VSWR of the antenna 14. A VSWR calculator 34 is coupled to the directional coupler 32. A first power line 36 sends a signal to the VSWR calculator 34 indicating the forward energy of the antenna 14. For example, the first power line 36 may have a voltage that is proportional to the forward power sent from the power amplifier to the antenna 14. A second power line 38 sends a signal to the VSWR calculator 34 indicating the reverse or reflected energy of the antenna 14. For example, the second power line 38 may have a voltage that is proportional to the reflected energy of the antenna 14. These signals are used by the VSWR calculator 34 to determine the VSWR of the antenna 14. Thus, the directional coupler 32 and the VSWR calculator 34 form a reflected energy detection circuit, which serves as the proximity sensing circuit 22. In other words, the proximity sensing circuit 22 includes a VSWR sensor serving as a reflected energy detector for detecting the reflected energy of the antenna 14. A routine executed by the sensing and control device 23 periodically reads the VSWR determined by the VSWR calculator 34. For example, the routine may be executed several times per second. Other devices for taking other various measurements of the reflected energy of the antenna 14 may be used in the same manner.

Figure 5:
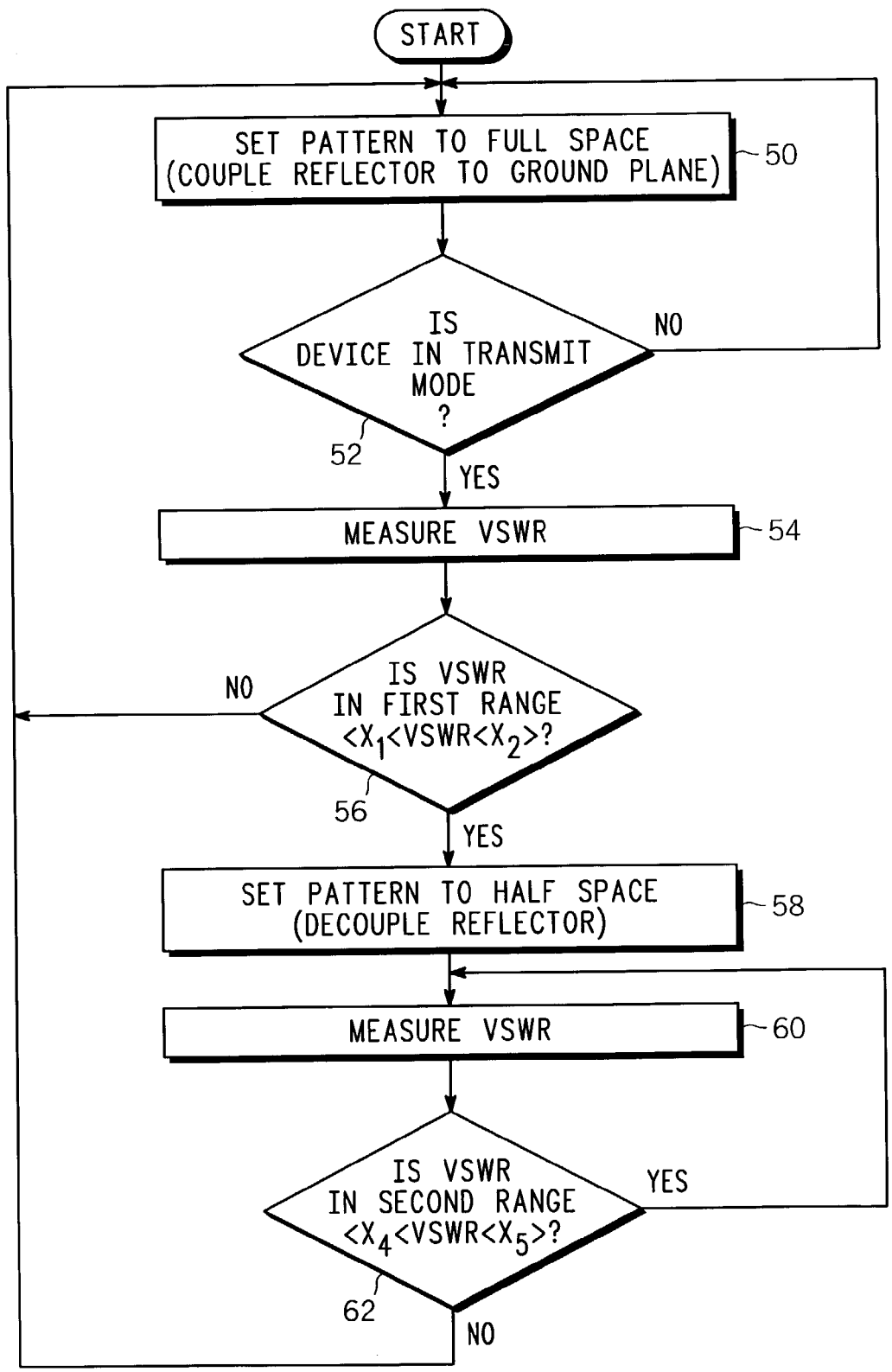
FIG. 5 is a flow chart illustrating a method of changing an antenna pattern in a wireless communication device.

Various control routines can employ the VSWR readings to control the state of the switching device 26. An example of one such control routine is illustrated in FIG. 5. In a full pattern setting operation 50, the switching device is set to couple the reflector element 18 to the ground plane 16 such that the antenna 14 radiates with a full space pattern. In a first decision 52, it is determined whether the communication device 10 is in a mode for transmitting. If not, the full pattern setting operation 50 is performed again. If so, the VSWR is measured or read in a first reading operation 54. Then, in a first range determining decision 56, it is determined whether the VSWR read in the first reading operation 54 is within a first range from $X_1$ to $X_2$. If not, the full pattern setting operation 50 is performed again. If so, the switching device 26 is set to decouple the reflector element 18 and cause the communication device 10 to radiate in a half space pattern in a half pattern setting operation 58. Then, the VSWR is measured or read in a second reading operation 60. Subsequently, in a second range determining decision 62, it is determined whether the VSWR read in the second reading operation 60 is within a second range (from $X_4$ to $X_5$). If so, the second reading operation 60 is performed again. If not, the full pattern setting operation 50 is performed again.

The reflected energy, or VSWR, of an antenna 14 will vary according to the material that is in close proximity to the antenna 14. The first range (from $X_1$ to $X_2$) of the first range determining decision 56 corresponds to a range of VSWR values that correspond to close proximity of the communication device 10 to a model of a human head. This range of values is determined experimentally or by computer simulation and is frequency dependent. For example a common tool known as a network analyzer can be used to determine an appropriate range of values of VSWR at a given transmission frequency while the communication device 10 is held in close proximity to the model. Thus, according to the routine of FIG. 5, if the measured VSWR is within the first range, then it is determined that the communication device 10 is in close proximity to a human head, and the radiation pattern of the antenna 14 is changed to half space by activating the reflector element 18.

The second range of VSWR values (from $X_4$ to $X_5$) corresponds to a range of VSWR values that correspond to close proximity of the communication device 10 to the model of a human head while the communication device 10 is radiating in a half space pattern. This range, like the first range, is experimentally determined, for example, with a network analyzer, or determined by computer simulation. Thus, according to the flow chart of FIG. 5, if the measured VSWR remains within the second range ($X_4$ to $X_5$), no change is made to the radiation pattern of the communication device 10. If the measured VSWR is outside of the second range, the full pattern setting operation 50 is performed again. That is, if there is an indication that the communication device 10 is no longer in close proximity to an object such as a human head, the radiation pattern is set to a full space pattern. Anytime there is an indication that the communication device 10 is in close proximity to a human head, a half space radiation pattern is employed in the control routine of FIG. 5.

The sensing and control device 23 that executes the routine of FIG. 5 will only change the radiation pattern to a half space pattern when the communication device 10 is in close proximity to an object that affects the radiation patter, such as a human head. Close proximity of the communication device 10 to other materials, such as wood, will not cause the sensing and control device 23 to change to the half-space pattern. For example, if the communication device 10 is a cellular telephone, and the telephone is resting on a wooden table, the VSWR will be different and will normally be outside of both the first and second ranges mentioned above. Therefore, the sensing and control device 23 will set the switching device 26 such that the reflector element 18 is coupled to the ground plane 16, that is, such that the reflector element 18 is inactive, when the cellular telephone is resting on a table. Thus, the radiation performance of the cellular telephone is improved when the telephone is resting on a table. If the sensing and control device 23 did not distinguish between objects such as a human head and a wooden table, the reflector 18 might be activated if the cellular telephone were resting on a table. If the telephone were resting on the table with the front surface of the telephone facing upward and the rear surface facing the table, the radiation from the telephone would be blocked on two sides by the reflector element 18 and the table, which would significantly degrade its performance. By properly choosing the first and second VSWR ranges of the routine of FIG. 5, the communication device 10 can distinguish between objects that affect the radiation pattern and other materials that do not.

Figure 6:
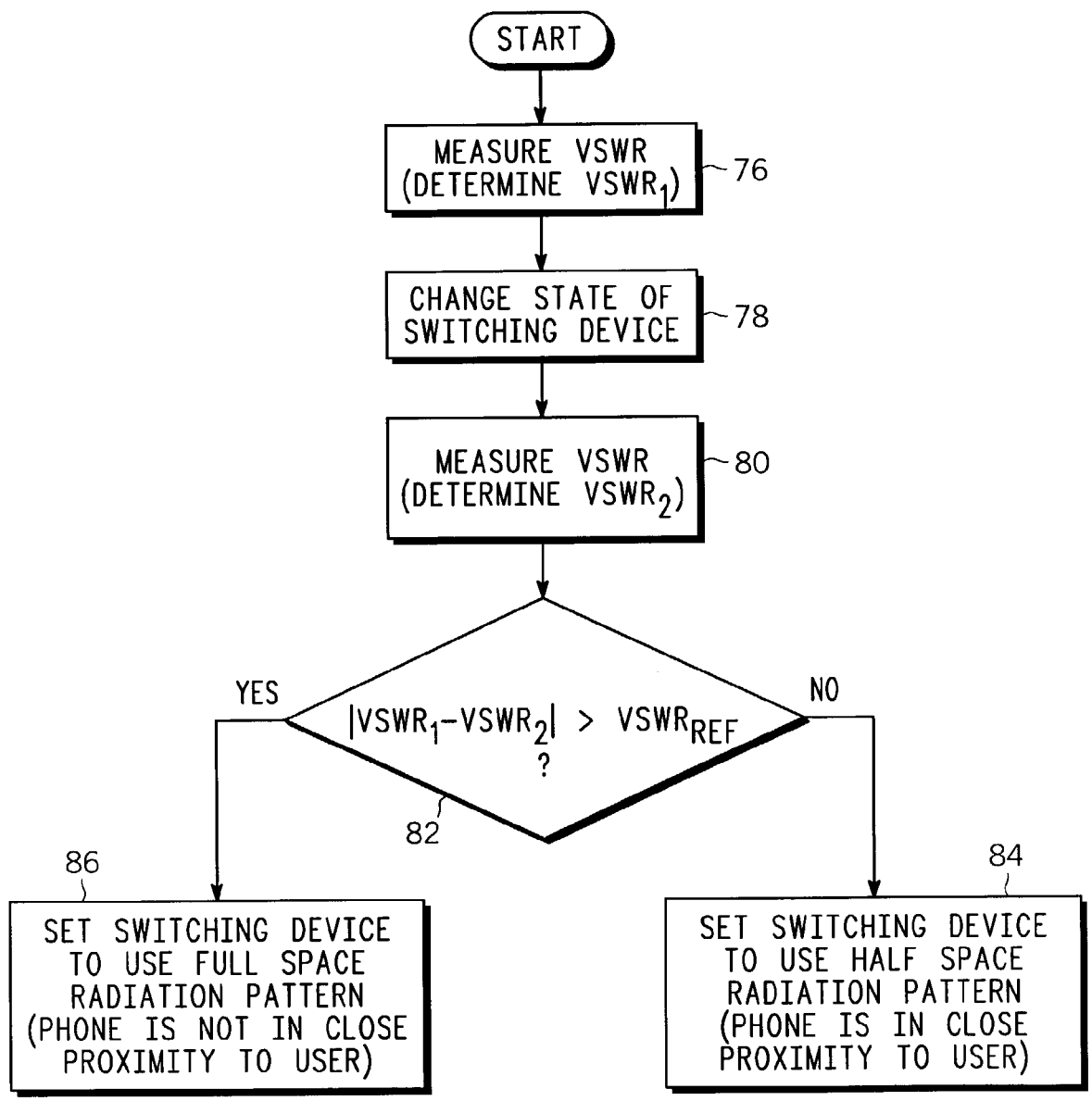
FIG. 6 is a is a flowchart illustrating routine for changing an antenna pattern in a wireless communication device.

FIG. 6 shows another routine that employs VSWR as an indication of proximity. In a first measuring operation 76, the VSWR is read or measured with the VSWR sensor 32, 34 to find a value named $VSWR_1$. Then, the state of the switching device 26 is changed in a state changing operation 78. That is, if the reflector element 18 is active, the reflector element 18 is coupled to the ground plane 16 to deactivate the reflector element 18. If the reflector element 18 is inactive, the reflector element 18 is activated. It is preferred that the reflector element 18 is initially active in this embodiment. Thus, it is preferred that the reflector element 18 is active at the start of the routine of FIG. 6. Then, the VSWR is measured in a second measuring operation 80 to determine a value named $VSWR_2$. Then, in a decision making operation 82, it is determined whether the absolute value of the difference between the two VSWR readings is greater than a reference value named $VSWR_{REF}$. If so, the switching device 26 is set to deactivate the reflector element 18 and to use a full space radiation pattern in a full pattern setting operation 86. If not, the switching device 26 is set to activate the reflector element 18 and to use a half space radiation pattern in a half pattern setting operation 84.

The routine of the flow chart of FIG. 6 is based on the fact that the VSWR will not change dramatically if the radiation pattern is changed when the communication device 10 is in close proximity to a human head. If the communication device 10 is spaced from a human, changing the state of the switching device 26 results in relatively great changes in the VSWR. When a large change in the VSWR is detected, the switching device 26 is set to deactivate the reflector element 18 and create a full space radiation pattern. Again, the reference value $VSWR_{REF}$ must be determined experimentally or by computer simulation. If used in a communication device 10 that includes a receiver, the routine of FIG. 6 may be executed only when the communication device 10 is in a transmission mode or it may include an operation that positively switches the radiation pattern to a full pattern when the device is in a reception mode.

Figure 7:
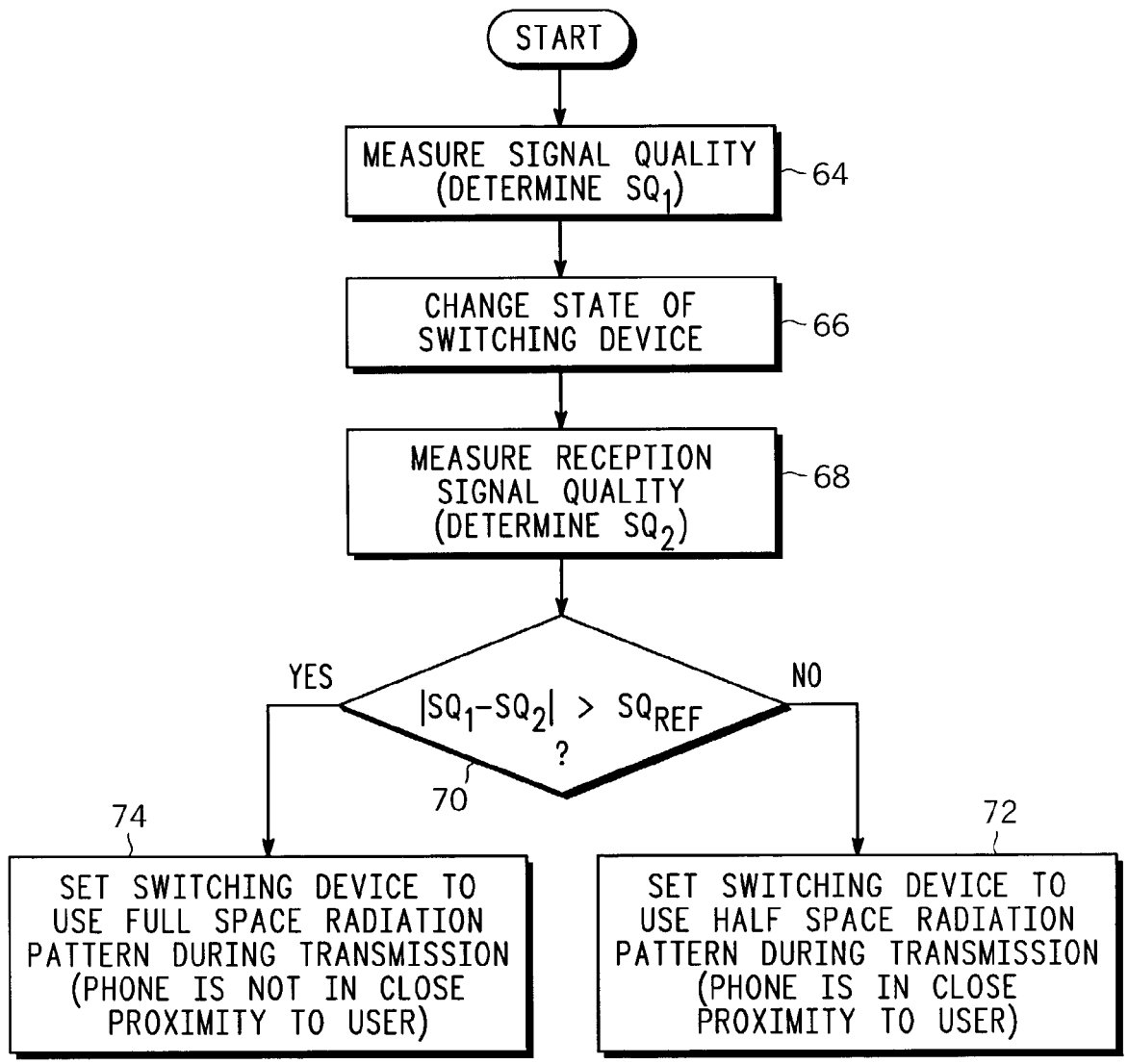
FIG. 7 is a flowchart illustrating another routine for changing an antenna pattern in a wireless communication device.

Another example of a control routine for controlling the status of the switching device 26 is illustrated in FIG. 7. This routine is for a communication device 10 that includes a receiver, such at that illustrated in FIG. 3. The routine of FIG. 7 is executed when the communication device 10 is in a reception mode. Although the routine of FIG. 7 is executed during reception, it determines the radiation pattern during transmission. In a first measuring operation 64, signal quality is read or measured with a signal quality sensor to find a value named $SQ_1$. Any known measure of signal quality such as BER (bit error rate), RSSI (received signal strength indicator), or AGC (automatic gain control) can be used to determine signal quality. That is, a known signal quality sensor can serve as the proximity sensing circuit 22. Then, the state of the switching device 26 is changed in a state changing operation 66. That is, if the reflector element 18 is active, the reflector element 18 is coupled to the ground plane 16 to deactivate the reflector element 18. If the reflector element 18 is inactive, the reflector element 18 is activated. Then, the signal strength is measured in a second measuring operation 68 to determine a value named $SQ_2$. Then, in a decision making operation 70, it is determined whether the absolute value of the difference between the two signal quality readings ($SQ_1$, $SQ_2$) is greater than a reference value named $SQ_{REF}$. If so, the switching device 26 is set to deactivate the reflector element 18 and to use a full space radiation pattern in a full pattern setting operation 74 during transmission. If not, the switching device 26 is set to activate the reflector element 18 and to use a half space radiation pattern during transmission in a half pattern setting operation 72.

The routine of the flow chart of FIG. 7 is based on the fact that the signal quality will not change dramatically if the radiation pattern is changed when the communication device 10 is in close proximity to an object that will effect the radiation pattern. If the communication device 10 is spaced from such an object, changing the state of the switching device 26 results in relatively great changes in the signal quality. When a large change in the signal quality is detected, the switching device 26 is set to deactivate the reflector element 18 and create a full space radiation pattern. Again, the reference value $SQ_{REF}$ must be determined experimentally or by computer simulation. The routine of FIG. 7 may be executed periodically, for example, several times per second.

The routines of FIGS. 5–7 may be executed by a processor that is included in either the antenna pattern control circuit 24 or the proximity sensing circuit 22. The processor may be a central processor that controls other features of the communication device 10 in a known manner. The routines of FIGS. 5–7 can be stored in a memory of the communication device 10 in a known manner.

Many cellular telephones include a hands-free mode of operation or they attach to an accessory (not illustrated) that provides hands-free operation. Such accessory devices typically take the form of speaker phones or remote head phone devices. A control routine for controlling the state of the switch may include sensing whether the communication device 10 is in a hands-free mode of operation. In a hands-free mode, the phone is normally not in close proximity to the user. Thus, the proximity sensing circuit may be a sensor that senses whether the phone is in a hands-free mode. If the communication device 10 is in a hands-free mode, the switching device 26 deactivates the reflector element 18 and thus changes to a full space radiation pattern.

Many communication devices include a talk button (not illustrated) that is depressed when the user wishes to transmit. The state of this button can determine the proximity of the communication device 10 to the user. That is, if the button is actuated to perform transmission, the switching device 26 is set to activate the reflector element 18 to use a half-space radiation pattern. Thus, the talk button is included in the proximity sensing circuit 22.

Similarly, the proximity detection circuit 22 may detect when the communication device 10 is in an idle state. The sensing and control device 23 sets the state of the switching device 26 to deactivate the reflector element 18 when the communication device 10 is in an idle state. That is, a device for sensing whether the communication device 10 is idle is included in the proximity sensing circuit 22. Therefore, an idle state is an indication that the communication device 10 is not in close proximity to the user. Since the communication device 10 is not in close proximity to a user, there is no benefit to changing the radiation pattern.

The invention thus may be viewed as an improved antenna apparatus for adapting to the surroundings of the communication device 10. The antenna apparatus includes an antenna 14 and a reflector element 18, and the reflector element 18 is activated when there is an indication that the antenna apparatus is in close proximity to a human. Close proximity may be determined by a number of different kinds of detectors.

In the preferred embodiment, the communication device 10 changes the antenna radiation pattern when it is determined that the communication device 10 is in close proximity to an object such as a human head. That is, the communication device 10 may be a transmitter that can be mounted either on a building or in an open space. If the transmitter is mounted on a building, a half space radiation pattern directed away from the building is preferred. Thus, the radiation pattern is changed to a half space pattern if the communication device 10 is determined to be in close proximity to an object, in this case a building, by the proximity sensing circuit 22. If no object is detected in close proximity to the communication device 10, the switching device 26 is set to couple the reflector element 18 and to permit a full space radiation pattern, which is preferred in open spaces.

The apparatus and methods discussed above and the inventive principles thereof are intended to and will alleviate problems caused by prior antennas and wireless communication devices. Using these principles of pattern control will facilitate compliance with FCC regulation and will contribute to user satisfaction. It is expected that one of ordinary skill given the above described principles, concepts and examples will be able to implement other alternative procedures and constructions that offer the same benefits. It is anticipated that the claims below cover many such other examples.

The disclosure is intended to explain how to fashion and use various embodiments in accordance with the invention rather than to limit the true, intended and fair scope and spirit thereof. The forgoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A wireless communication device comprising:
   a transmitter;
   an antenna coupled to the transmitter for transmitting radio waves;
   a reflector element, which cooperates with the antenna to permit the communication device to transmit radio waves in full space when inactive and to cause the communication device to transmit in half-space when active; and a switching device for activating and deactivating the reflector element, the switching device electrically shorting the reflector element to a ground plane of the communication device when closed, wherein the reflector element functions as another ground plane.

2. The wireless communication device according to claim 1, wherein the communication device further comprises a proximity sensing circuit for determining whether the communication device is in close proximity to an object, and the proximity sensing circuit causes the switching device to activate the reflector element when the communication device is in close proximity to an object.

3. The communication device according to claim 2, wherein the proximity sensing circuit senses whether the communication device is in close proximity to an object, and the circuit causes the switching device to open if the circuit determines that the communication device is in close proximity to the object.

4. The communication device according to claim 2, wherein the proximity sensing circuit senses whether the communication device is in close proximity to a user, and the proximity sensing circuit causes the switching device to open if the proximity sensing circuit determines that the communication device is in close proximity to the user.

5. The wireless communication device according to claim 1, wherein the communication device further comprises a proximity sensing circuit for determining whether the communication device is in close proximity to a human head, and the proximity sensing circuit causes the switching device to activate the reflector element when the communication device is in close proximity to a human head.

6. The wireless communication device according to claim 1, wherein the communication device includes a proximity sensing circuit for determining whether the communication device is in close proximity to an object, and the proximity sensing circuit causes the switching device to activate the reflector element when the communication device is in close proximity to an object, wherein the proximity sensing circuit senses the reflected energy of the antenna, and the sensed reflected energy is used to determine the state of the switching device.

7. The wireless communication device according to claim 6, wherein the proximity sensing circuit includes a VSWR sensor for detecting the VSWR of the antenna.

8. The communication device according to claim 1, wherein the switching device creates ohmic contact between a chassis of the communication device when closed.

9. The communication device according to claim 1, wherein the switching device includes a first switch, which is located at a first end of the reflector element, and a second switch, which is located at a second end of the reflector element, wherein the second end of the reflector element is opposite to the first end of the reflector element, and the first switch couples the first end of the reflector element to a corresponding end of a chassis of the communication device, and the second switch couples the second end of the reflector element to a corresponding end of the chassis.

10. A wireless communication device comprising:
a transmitter;
an antenna coupled to the transmitter;
a reflector element, wherein the reflector element cooperates with the antenna such that the device transmits radio waves in a limited pattern when the reflector element is activated;

a switching device for electrically coupling the reflector element to the communication device and for electrically isolating the reflector element from the communication device;

a sensing and control device for sensing whether the wireless communication device is in close proximity to a user, wherein the sensing and control device controls the switching device according to a sensed condition such that the radiation pattern is changed to the limited pattern at least when the communication device is in close proximity to a user, wherein the sensing and control device includes a reflected energy detection circuit for sensing the reflected energy of the antenna, wherein the sensed energy determines the state of the switching device.

11. The communication device according to claim 10, wherein the switching device electrically couples and decouples the reflector element to a ground plane of the communication device.

12. The wireless communication device according to claim 10 wherein the reflected energy detection circuit further includes a VSWR (voltage standing wave ratio) sensor for detecting VSWR of the antenna.

13. The wireless communication device according to claim 10 wherein the switching device electrically couples and decouples the reflector element to a chassis of the wireless communication device.

14. The wireless communication device according to claim 10 wherein the switching device further comprises a plurality of switches coupled to different portions of the reflector element.

15. A method for changing the radiation pattern of an antenna device that is coupled to a wireless communication device, wherein the method comprises:
setting the pattern to one of a full space pattern or a half space pattern by coupling or decoupling a reflector element of the antenna device;
determining whether the communication device is in a transmit mode;
sensing a condition of the transmitter, the sensing including sensing reflected energy of the antenna;
switching the pattern to the other of the full space pattern or the half space pattern according to the sensed condition.

16. The method according to claim 15, wherein the coupling or decoupling is performed by closing or opening a switching device that couples a reflector element to a ground plane of the communication device.

17. The method according to claim 15, wherein the sensing includes sensing the proximity of a user of the communication device.

18. The method according to claim 15, wherein the sensing includes determining whether the communication device is in an idle state.

19. The method according to claim 15, wherein the sensing includes determining whether the communication device is operating in a hands-free mode.

20. The method of claim 15, wherein the method includes switching the pattern to a half space pattern when the level of reflected energy is within a predetermined range, wherein the predetermined range corresponds to a condition in which the antenna is in close proximity to a human head.

* * * * *